(12) United States Patent
Lee et al.

(10) Patent No.: US 6,668,738 B2
(45) Date of Patent: Dec. 30, 2003

(54) BULK FILL DELIVERY VENTURI SYSTEM

(75) Inventors: Laurence K. Lee, Darien, IL (US);
Guntis Ozers, Woodridge, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/101,877

(22) Filed: Mar. 21, 2002

(65) Prior Publication Data

US 2003/0177967 A1 Sep. 25, 2003

(51) Int. Cl.[7] ................................................ A01C 7/04
(52) U.S. Cl. ........................................ 111/175; 111/174
(58) Field of Search ................................ 111/175, 174, 111/170, 176; 221/211

(56) References Cited

U.S. PATENT DOCUMENTS

| | | | | |
|---|---|---|---|---|
| 5,092,526 A | * | 3/1992 | Takata | 239/655 |
| 5,161,473 A | | 11/1992 | Landphair et al. | 111/176 |
| 5,379,706 A | | 1/1995 | Gage et al. | 111/175 |
| 5,524,559 A | * | 6/1996 | Davidson | 111/200 |
| 5,575,225 A | * | 11/1996 | Smith et al. | 111/174 |
| 5,601,209 A | * | 2/1997 | Barsi et al. | |
| 5,996,516 A | | 12/1999 | Benneweis et al. | 111/176 |
| 6,047,652 A | | 4/2000 | Prairie et al. | 111/174 |
| 6,158,363 A | | 12/2000 | Memory et al. | 111/176 |
| 6,164,222 A | | 12/2000 | Mayerle et al. | 111/175 |
| 6,192,813 B1 | | 2/2001 | Memory et al. | 111/176 |
| 6,213,690 B1 | * | 4/2001 | Gregor et al. | 406/123 |
| 6,267,067 B1 | | 7/2001 | Mayerle et al. | 111/170 |
| 6,290,433 B2 | | 9/2001 | Poncelet et al. | 106/181 |
| 6,296,425 B1 | | 10/2001 | Memory et al. | 106/197 |
| 6,298,797 B1 | | 10/2001 | Mayerle et al. | 111/175 |

* cited by examiner

Primary Examiner—Christopher J. Novosad
(74) Attorney, Agent, or Firm—Rebecca Henkel

(57) ABSTRACT

A particulate distribution system for transporting seed or other particulate from a source into a plurality of metering bins, the system including a forced air source, a converter for splitting air form the source into separate flows in converter outlet lines, venturis for receiving the air flows and entraining particulate from a main hopper therein and a manifold delivery system that directs the entrained particulates to mini-hoppers and that opens at an outlet end back into the main hopper.

16 Claims, 6 Drawing Sheets

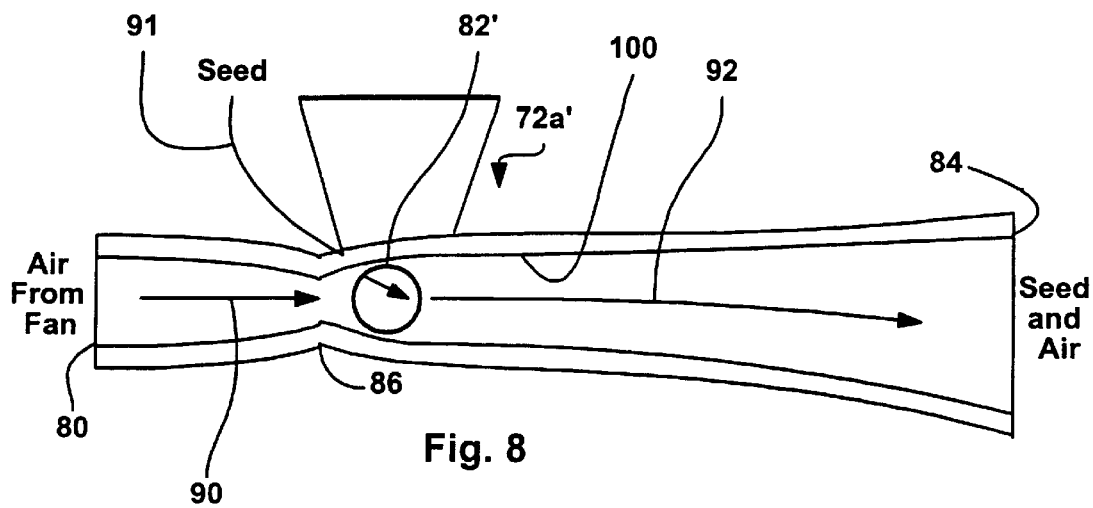
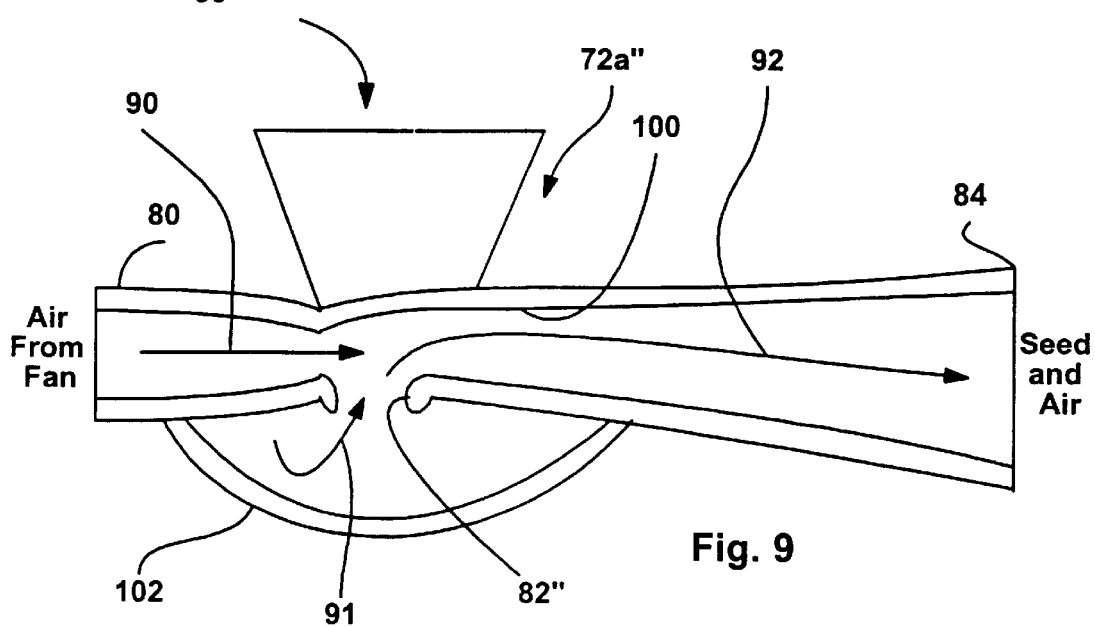

BULK FILL DELIVERY VENTURI SYSTEM

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention is related generally to agricultural implements and more specifically to an improved apparatus and method for transferring agricultural seed or other particulate material from a principal storage site to individual material metering hoppers mounted on planters, grain drills and the like.

BACKGROUND OF THE INVENTION

In the past, distribution of seed (or other particulate material such as fertilizer) for use in a variety of agricultural operations has been facilitated via a planter apparatus including a wheel supported carrier frame having a hitch for linking to a tractor or other prime mover, an implement bar mounted to the frame perpendicular to the transport direction and a plurality of row units (e.g., 8 to 32) mounted to and essentially equi-spaced along the length of the implement bar. Among other components, each row unit typically includes some type of seed bin that opens downwardly into a dispenser assembly and some type of soil agitator (e.g., a coulter or knife member) juxtaposed on the transport side of the dispenser. During transport through a field the agitator is forced through soil there below and forms a seed trench. As its label implies, the dispenser dispenses a pre-selected quantity of seed downward and behind the agitator into the trench.

The individual seed bins generally have limited storage capacity. For instance, many row unit seed bins are limited to between one and three bushel volumes. For this reason, these types of planter assemblies required frequent bin refilling. Unfortunately, seed filling stations (e.g., typically a barn or other storage unit) are typically stationary and therefore filling exercises often required a trip out of the fields back to a station and then a trip back to the fields to continue the seeding process. These filling trips increased the overall time required to plant fields. In addition to the round trip time required to refill bins, the refilling process itself was tedious as each separate row unit bin had to be filled during each filling exercise.

In an effort to reduce the number of seed refilling exercises required to seed a field, the industry has developed systems including one or more large seed reservoir hoppers mounted to the carrier frame that are transported along with the row units. A seed distribution system in which seed is conveyed from an equipment-mounted main hopper is described in U.S. Pat. No. 5,161,473 (hereinafter the '473 patent) which issued on Nov. 10, 1992 and which is assigned to Deere and Company. The '473 patent utilizes a single main hopper which dispenses seed to a plurality of individual mini-hoppers that each, in turn, supply seed to an individual row unit. The seed is fed from the main hopper into each mini-hopper by entraining it in an air stream contained in separate, individual seed transfer hoses that are connected between the main tank and each of the individual mini-hoppers. To minimize costs, ideally, the mini-hoppers are designed to be as small as possible and to require as little material as possible.

U.S. Pat. No. 5,379,706 (hereinafter "the '706 patent") which issued on Jan. 10, 1995 and is assigned to Agco Corporation describes another seed transporting system which also utilizes a central storage hopper for supplying a plurality of smaller satellite hoppers via a plurality of individual hoses or tubes running from the central hopper to each of the individual row units. Thus, while the systems of the '173 and '706 patents provide for the maintenance of seed supply quantities in the row hoppers or bins during seeding operations, they also require the incorporation of a large number of separate seed transport tubes in those systems where multiple, mini-hoppers are present. As in the case of most mechanical systems, in the case of multiple mini hopper systems requiring separate feed tubes, costs associated with the additional seed delivery tubes and related components are appreciable.

To reduce seed delivery costs associated with multi-tube delivery systems, there have been attempts at configuring a delivery system including essentially a single seed delivery tube or manifold assembly for delivering seed to all or an appreciable number (e.g., half) of the row units. For example, U.S. Pat. No. 6,047,652 (hereinafter "the '652 patent") which issued on Apr. 11, 2000 and which is assigned to the same assignee as the present invention, teaches a delivery system having a manifold assembly including a plurality of manifold sections and diverting structures that together form a single sinuous-shaped passageway that opens into each of four separate metering bins. A separate diverter structure is mounted generally above each of the metering bins. A supply duct is linked between the particulate source and the first diverting structure and a separate intermediate duct is mounted between each two adjacent diverting structures.

The source described in the '652 patent includes a fan at the base of a main hopper that blows air through a head of seed and into a bottom end of the supply duct. Exemplary supply and intermediate ducts may be approximately 2 inches in diameter. Each diverting structure, as its label implies, diverts a portion of the air borne seed entering the structure downward through a tube and into an associated metering bin. Another portion of the seed entering each diverting structure is directed to a following manifold duct and hence to a subsequent diverting structure and corresponding metering bin.

The '652 patent embodiment includes four separate manifold configurations fed by a single fan source where each manifold feeds four separate metering bins. Other configurations are contemplated. For instance, where the fan is powerful enough 6 or even 8 metering bins may be fed via a single manifold configuration.

According to the '652 patent, the structure described operates as follows. With seed or some other particulate in a main hopper, when the air source is turned on, seed is entrained in the air and forced through the manifold assembly. As seed passes through the diverting structures some of the particulate is diverted into each of the metering bins. Eventually the bins fill with seed and the diverting structures become blocked. When one diverting structure becomes blocked, the air borne seed is delivered to other unblocked structures and, theoretically, there is a constant seed source provided to instantly refill the metering bins.

In reality, unfortunately, it has been found through empirical evidence that the '652 patent assembly has at least two important shortcomings. First, when all of the diverter structures become blocked, particulate and air flow to the manifold assembly as a whole is blocked. When the manifold as a whole is blocked the seed in the manifold generally settles and is not air borne. Thereafter, when one or more of the diverter structures becomes unblocked via metered seed distribution, there is a delay period during which the manifold flow resumes when no seed is delivered to the unblocked structure. Where the metering bins are relatively small, the delay periods have been known to result the metering bins being emptied prior to manifold seed delivery. This is particularly true in the case of the row units that are farthest removed from the source. Even short periods of empty bins causes uneven distribution of seed material which is unacceptable in many applications.

Second, the air-seed source configuration used to deliver seed in the '652 patent, it turns out, is not very efficient. To this end, generally, it has been determined that seeds can be transported satisfactorily with an air velocity of 5000 to 6000 feet per minute (FPM). With a 2 inch hose diameter, 5000 to 6000 FPM velocity translates into approximately 150 cubic feet per minute (CFM) of air.

An exemplary fan employed in delivery experiments was designed to run at peak efficiency (approximately 48%) when it delivers approximately 1000 to 2000 CFM of air at a speed between 3450 and 6000 RPM.

Unfortunately, experiments have shown that, with the exemplary fan employed in the '652 patent air-source configuration, the configuration was able to deliver seeds from a main hopper to 6 to 8 metering bins when the fan was running at around 5500 and 6000 RPM. In other words, with the '652 patent configuration, instead of generating 2000 CFM of air at 6000 RPM, the fan running at 6000 RPM only generated approximately 140 CFM of air at the ends of the manifold duct and thus fan efficiency was less than 10%. This air volume loss is attributable in great part to imperfectly sealing duct and diverter connectors, the sinuous or curved configuration of the manifold and the pressure required to, in effect, blow through the head of seed that fills the bottom end of the main hopper.

Moreover, in the case of larger planter assemblies including more row units, for example, 32 row units, the fan employed in the experiments would not be able to deliver sufficient air pressure to meet delivery requirements.

One solution to the air pressure problem may be to employ a positive displacement blower instead of a fan to overcome all of the pressure losses in the manifold. Positive displacement blowers are well known in the pneumatics art and therefore will not be described here in detail. Unfortunately, while a positive displacement blower may overcome may be more efficient at providing required air pressure throughout a line, such blowers are relatively expensive and therefore are cost prohibitive in most applications.

Therefore, a need exists for a single manifold particulate delivery system that will not cause delay periods during which air borne particulate flow must be re-established. In addition, it would be advantageous to have a fan or air source configuration that is relatively inexpensive and yet extremely efficient.

BRIEF SUMMARY OF THE INVENTION

It has been recognized that a venturi can be mounted between a fan and the supply duct of a manifold configuration with a main particulate hopper opening down wind of a restricted portion (i.e., the venturi orifice) of the venturi so that fan air supplied to the venturi creates a negative pressure at the orifice sufficient to draw particulate into the air stream and deliver the particulate to the manifold. As in the case of the '652 patent, the venturi feeds a plurality of series connected metering bins to supply seed thereto. By using a venturi to draw seed into an air flow instead of requiring the fan to blow through a head of seed, an appreciably more efficient configuration is provided where the initial air pressure drop through the seed head is eliminated.

In one embodiment, the fan feeds a converter assembly that splits that fan air into a plurality of separate air streams in separate air hoses and each of the separate hoses feeds a separate venture which in turn feeds a plurality of series connected metering bins. In a particularly useful embodiment, the number of converter outlet hoses is selected by taking into account fan efficiency parameters and the CFM required through each of the venturi connected manifolds to efficiently deliver seed to the metering bins. To this end, as indicated above, the exemplary fan is most efficient when delivering between 1000 and 2000 CFM at speeds between 3450 and 6000 RPM and, for proper seed delivery through a 2 inch tube, approximately 140 CFM of air is required. Thus, where the converter includes eight separate outlet tubes, the combined CFM required for eight outlet tubes is 1120 CFM the fan runs within its peak efficiency range of 1000 to 2000 CFM. Other configurations within the peak range are contemplates.

After the number of converter outlets has been determined, the number of metering bins to be fed by each venturi can be determined by dividing the total number of row units required by the number of converter outlets. For example, where 32 row units are required and the converter has eight outlets, the number of row units fed by each outlet, venturi and manifold configuration is four. It should also be noted that where only four units are fed by each venturi the pressure drop through the manifold linked to the venturi will be less than where more units are fed and thus efficiency is enhanced in this manner as well.

Unfortunately, as in the case of the '652 patent configuration, the venturi configuration described above can result in delay period problems when diverter structures become blocked. In addition, where the main hopper opens downward into the venturi, when diverter structures become blocked, seed from the main hopper can fill a large portion of the venturi cavity and create a seed head. In this case, where a converter splits fan air into fractional CFM, the air pressure is often too small to overcome the seed head or may require even a longer delay period to push through a seed head.

It has been recognized that the problems described above and related to delay periods during which air borne particulate flow must be re-established can be overcome by simply providing a return manifold duct or the like between the last in a series of diverter structures and the particulate hopper or air source. By providing a return passageway that remains unobstructed at all times, even when all of the diverter structure openings into the metering bins become blocked, the air borne particulate flow continues through the return passageway and is constant. Thus, when one or more of the diverter structures re-opens, particulate within the flow is immediately present to fill the metering bin there below.

In addition, it has been recognized that the venturi can be designed to minimize or essentially eliminate the possibility of building up a seed head when all of the diverter structure openings become blocked. To this end, by having the hopper open into a side or the underside of the venturi, the seed can be prevented from filling and blocking the cavity while still providing a seed source at the hopper-venturi opening that can be sucked and entrained into the flowing venturi air. Some embodiments include each of the venturi concepts as well as the return duct concept described above.

Consistent with the above discussion, the present invention includes an apparatus for pneumatically transporting particulate material from a main hopper to at least a first mini-hopper sub-set, the apparatus comprising a forced air source having a fan outlet, a venturi mounted generally below the main hopper, the venturi forming a venturi passageway between an air inlet and a venturi outlet, the passageway including a restricted section between the inlet and the venturi outlet such that, when air is forced there through, the restricted section causes a vacuum at a vacuum point downstream of the restricted section, the venturi also forming a particulate inlet proximate the vacuum point, the particulate inlet linked to the hopper for receiving particulate there from and the air inlet linked to the air source and at least one manifold assembly that links the venturi outlet to the first mini-hopper sub-set.

In some embodiments the particulate inlet opens into the passageway from above. In other embodiments the particulate inlet opens into the passageway from below. In still other embodiments the particulate inlet opens into a lateral side of the passageway.

In some applications the apparatus is for, in addition to delivering particulate to the first mini-hopper sub-set, delivering particulate to N−1 additional mini-hopper sub-sets, in addition to the at least one venturi and the at least one manifold assembly, the apparatus further including at least N−1 additional venturis and N−1 additional manifold assemblies, the N−1 venturis mounted generally below the main hopper and having a design similar to that of the first venturi, the N−1 venturi air inlets linked to the air source and the N−1 venturi particulate inlets linked to the hopper for receiving particulate there from, each of the N−1 manifold assemblies linking a separate one of the N−1 venturi outlets to a separate one of the N−1 mini-hopper sub-set.

Here, the apparatus may further include a converter linked to the air source via a single air duct and including N separate converter outlet ducts, each outlet duct linked to a separate one of the N venturis, the converter dividing the air flow received form the air source approximately evenly among the N outlet ducts. More specifically, the mini-hoppers may include X mini-hoppers and each sub-set may includes X/N mini-hoppers. In a particular embodiment X is 32 and N is 8.

In some embodiments the manifold assembly forms a manifold passageway linked at an inlet end to the venturi outlet and having openings along its length that open into the mini-hoppers in the sub-set. Here, the manifold passageway may be sinuous where the openings are vertically lower than the manifold passageway sections there between. More specifically, the sub-set may include Y series linked mini-hoppers and the manifold may include diverter structures for each of the first Y−1 mini-hoppers in the sub-set and a plurality of manifold ducts including a supply duct and intermediate ducts, each diverter structure having an inlet and first and second outlets, the supply duct linking the venturi outlet to the inlet of a first diverter structure, a separate intermediate duct linking the outlet of a preceding diverter structure to the inlet of a following diverter structure for the second through (Y−1)st diverter structures, an intermediate duct linking the outlet of the (Y−1)st diverter structure to the Yth mini-hopper and the second outlets of each of the diverter structures opening into separate ones of the mini-hoppers. The end of the manifold passageway may open into the main hopper.

Moreover, the invention further includes an apparatus for pneumatically transporting particulate material from a main hopper to at least N mini-hopper sub-sets, the apparatus comprising a forced air source having a fan outlet, a converter operably linked to the air source to receive forced air there from and to split the received air flow into N separate air flows through N separate converter outlet lines, N venturis mounted generally below the main hopper, each venturi forming a venturi passageway between an air inlet and a venturi outlet, each passageway including a restricted section between the inlet and the venturi outlet such that, when air is forced there through, the restricted section causes a vacuum at a vacuum point downstream of the restricted section, each venturi also forming a particulate inlet proximate the vacuum point, the particulate inlets linked to the hopper for receiving particulate there from and each air inlet linked to a separate one of the converter outlets and N manifold assemblies, each manifold assembly linking a separate one of the venturi outlets to a separate one of the N mini-hopper sub-sets.

Again, here, each manifold assembly may form a manifold passageway linked at an inlet end to a corresponding venturi outlet and having openings along its length that open into the mini-hoppers in a corresponding sub-set and, wherein, the ends of the manifold passageways open into the main hopper.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 8 is similar to FIG. 7, albeit of another venturi embodiment where a hopper opens into a lateral side of the venturi; and FIG. 9 is similar to FIG. 7 albeit of yet one other venturi embodiment where a hopper opens into the underside of the venturi.

DETAILED DESCRIPTION OF THE INVENTION

Figure 1:
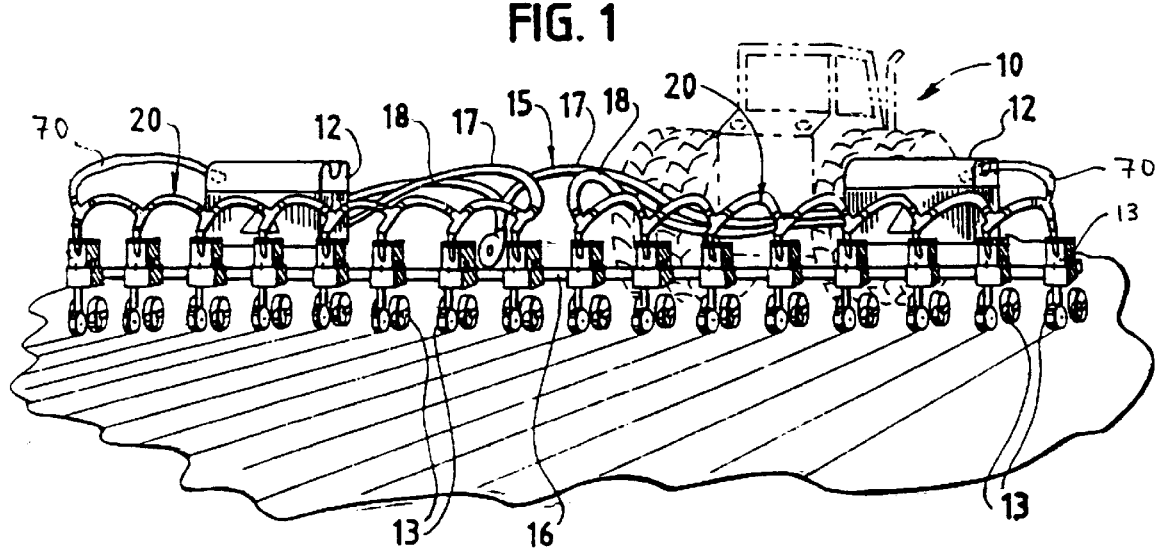
FIG. 1 is a schematic illustration showing how the material transporting apparatus of this invention is used in conjunction with agricultural equipment.

For a more complete understanding of the invention, reference is made to the drawings and initially to FIG. 1, which shows the pneumatic seed transporting system of this invention as it would be used in conjunction with an agricultural planter or seeder. In FIG. 1, a planter 10 may be connected to a tractor (not separately numbered) for transport through a field. The planter or seeder 10, is shown as having two central storage or reservoir hoppers 12 and a plurality of individual distribution or row metering hoppers or metering bins 13 that receive seed from the storage hoppers 12 by means of a distribution system or manifold assembly indicated generally by the numeral 15. Generally speaking, central storage tanks 12 could have capacities ranging from 20 to about 60 bushels while the individual row bins would characteristically range from about 1 to 3 bushels in capacity. Each of the row metering bins 13 will have an associated seed metering device that applies the seed to the soil in a manner well-known in the art.

Figure 2:
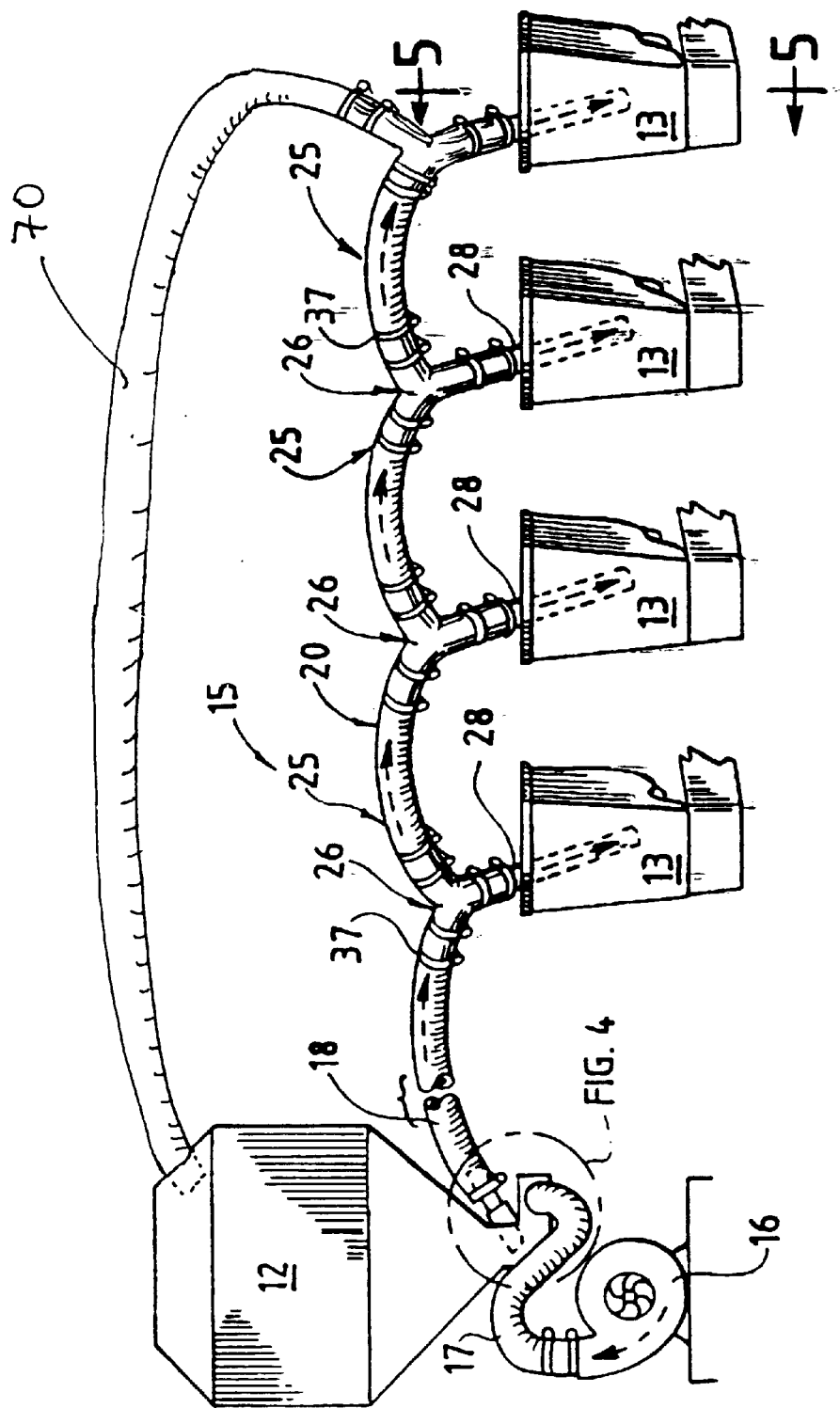
FIG. 2 is a schematic view showing the present apparatus design for transporting material from a supply bin to separate distribution bins.

Referring also to FIG. 2, assembly 15 includes, among other components, a plurality of manifold sections 18, 25, 70, and diverting structures 26 that together form a single sinuous-shaped passageway that opens into each of the metering bins 13. A separate diverter structure 26 is mounted generally above each of the metering bins 13. A supply duct or supply tube 18 is linked between the particulate source (e.g., 12 and 16) and the first diverting structure. A separate intermediate duct (collectively identified by numeral 25, three shown in FIG. 2) is mounted between each two adjacent diverting structures 26. Each diverting structure 26, as its label implies, diverts a portion of the air borne particulate entering the structure downward and into an associated metering bin 13. Another portion of the particulate entering each diverter structure 26 is directed to a following manifold duct and hence to a subsequent diverter structure and corresponding metering bin.

Figure 4:
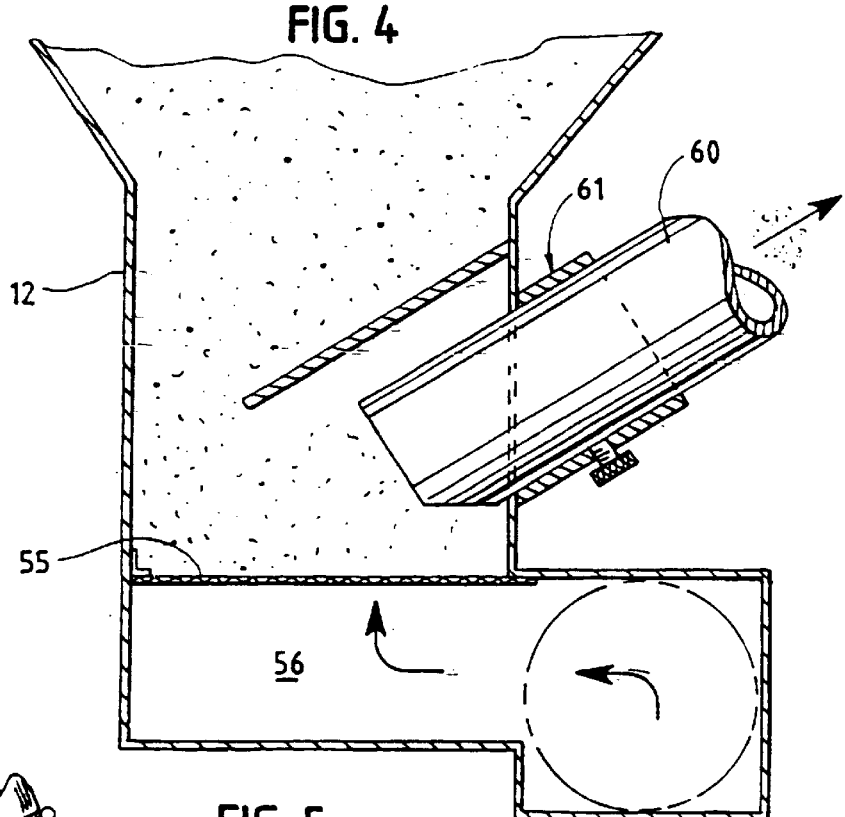
FIG. 4 is partial sectional view of a portion of the supply bin showing how material is directed into the transport system.

In addition, a return duct 70 is mounted to the last diverter structure in a series of structures and, as its label implies, is linked back to the source 12. Return duct 70, like the other manifold ducts, forms an arcuate or curved passageway for transporting air born seed. Each seed supply duct 18 is connected to supply seed up to four individual row hoppers such that, in FIG. 1, the planting system is capable of sowing seed in thirty-two rows with eight separate ducts 18. The delivery system includes a source of air, such as blower 16, that is connected by air supply tubes 17 to the bottom of storage hoppers 12. Air entering hopper 12 picks up seeds and pneumatically transports them through tubes 18 into the inlet ends of first diverter structures 26, as shown in FIG. 4 and discussed below.

Figure 3:
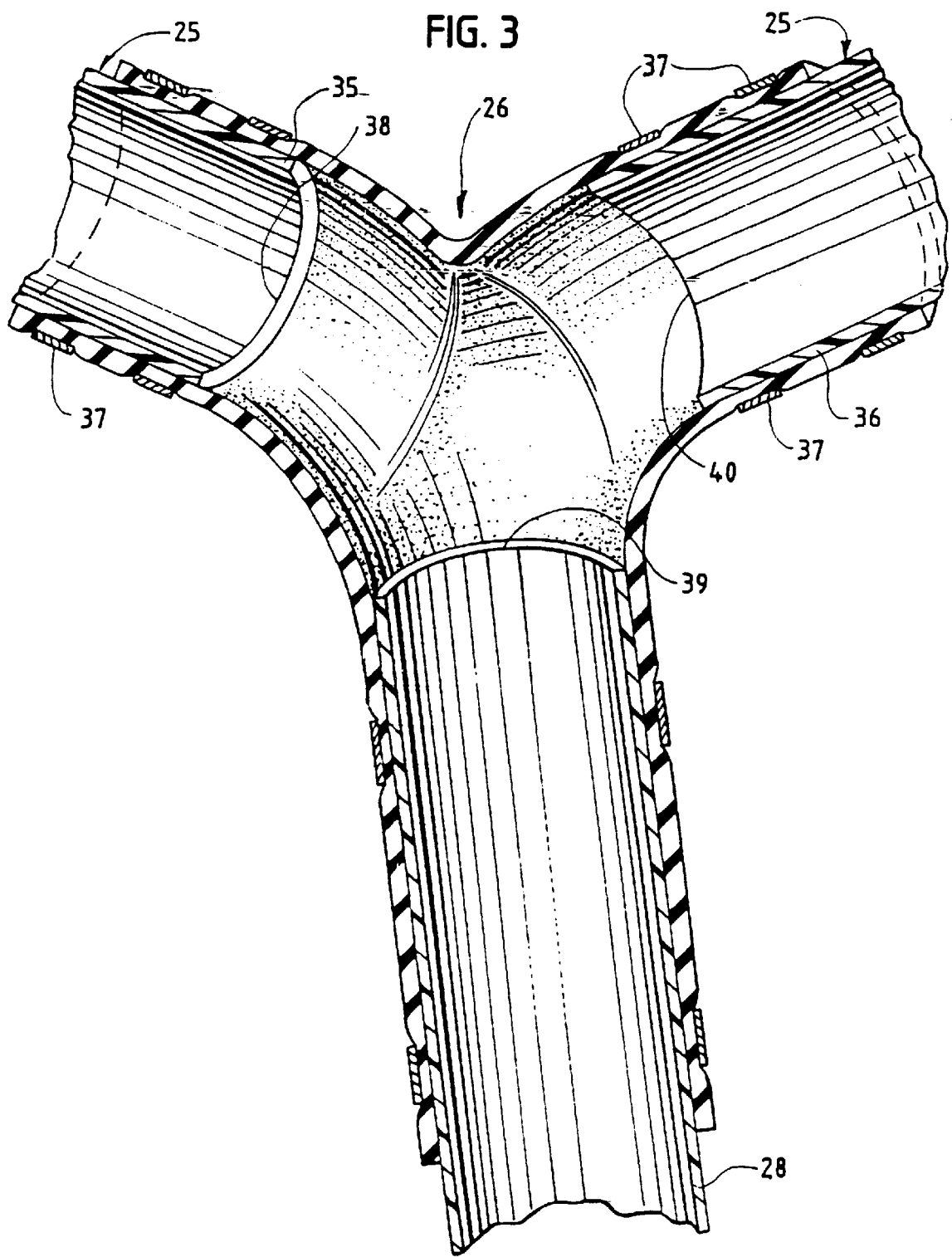
FIG. 3 is a is an enlarged sectional view of a flow diverter.

Referring still to FIG. 2, main manifold duct assembly 20 is comprised of a series of manifold sections 25 that are joined at the inlet and outlet end of each section by seed flow diverting means 26. Sections 25 are configured in such a way that the midsection of is each section is located at an elevation that is further above the row bins 13 than are the ends thereof so that the outlet end of each section extends in a downward direction into the inlet 38 of a seed flow diverter 26 of generally Y-shaped configuration. Diverter 26 has a downwardly directed outlet 39 that can be used with a bin feed tube 28 which extends into the interior of the bins for the flow of seeds there into and diverter 26 has a second outlet opening 40 which extends upwardly for connection into the inlet side of the succeeding manifold section 25 (see. FIG. 3). Again, supply duct 18 and return duct 70 are linked to the inlet of the first diverter structure 26 and the outlet of the last diverter structure 26, respectively, and each is also linked to the source 12, 16.

As best seen in FIG. 3, an exemplary Y-shaped diverter 26 is shown connected to the outlet end 35 of a manifold section 25 and to the inlet end 36 of the following manifold section 25. The connection of diverter 26 to the outlet end 35 and inlet end 36 can be made with suitable fasteners such as hose clamps 37. Thus, diverter 26 has an inlet opening 38, first outlet opening 35 and a second outlet opening 40, as described above. As seed flows through the manifold section shown on the left in FIG. 3, it initially passes through the high point or upper node of the section 25 and then flows downwardly toward the outlet end 35 and into the inlet opening 38 of diverter 26. The shape of the diverter directs seed flow straight down into the outlet opening 39 and into bin feed tube 28. At the beginning of the bin filling operation virtually all of the seed coming from a hopper 12 will flow into the initial row bin, since the direction of seed flow in diverter 26 is towards opening 38.

Each of the manifold sections 25 is shaped in such a way that the mid portion of the section located between the inlet and outlet ends is located elevationally higher from the bins than are either the inlet or the outlet end. That is, the overall configuration of the manifold duct forms a defined passage that is roughly sinuous so that the intermediate portion of each section 25 defines a relatively higher node and the diverting means 26 which connects the outlet end of one section to the inlet section of the following section defines a relatively lower node in the passage. By providing an upwardly curved configuration in each section, material that is being advanced through the manifold 20 approaches the diverter means 26, in each instance, in a downward direction so that it will be caused to continue to flow downwardly into one of the underlying bins 13.

Diverter structure 26 may include a bin filler tube 28 which extends downwardly into the associated bin and which may be adjustable to adjust how far the tube 28 extends into a corresponding the bin in order that the quantity of seed accumulating in the bin can be varied. That is, more or less seed can be delivered into a bin depending upon the quantity chosen by the operator to be sufficient in a particular application.

Figure 5:
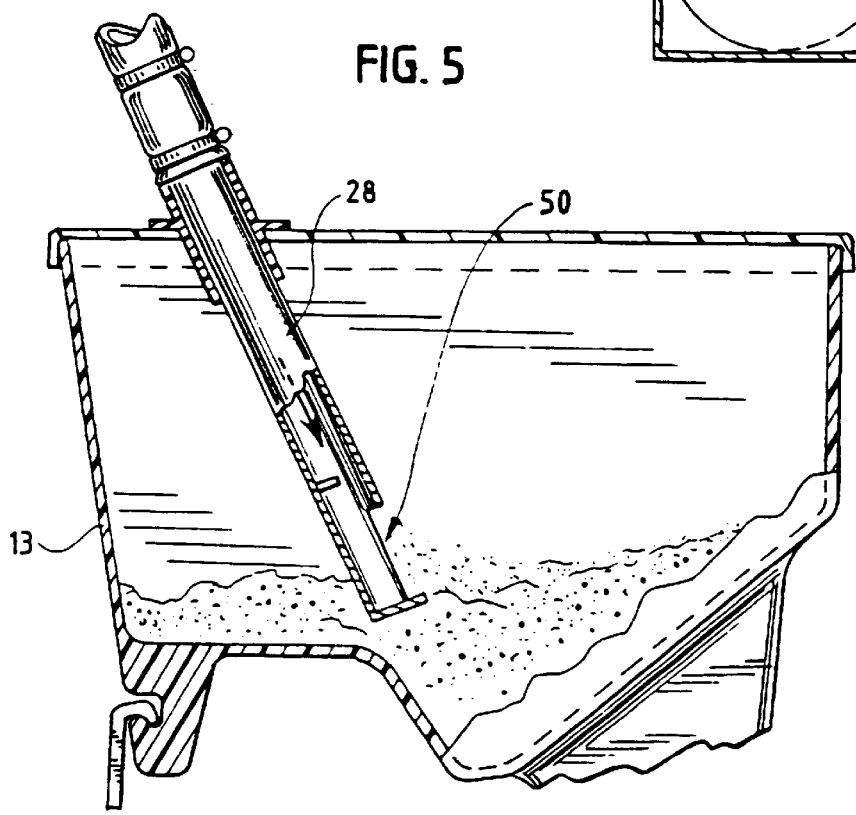
FIG. 5 is a side view, partially sectioned, illustrating the disposition of the outlet of a material diverter means in a distribution bin.

FIG. 5 of the drawings shows the manner in which bin filler tube 28 can be located within the metering bin 13. Specifically tube 28 extends adjustably into the bin through the top thereof, the particular location not being of any particular significance and the seed flows into the bin through the opening 50. After sufficient seed has entered into the bin, the orifice or outlet opening 50 will become blocked by seed and further entry of seed into that bin will continue until seed reaches diverter 26. By adjusting the position of opening 50 either higher or lower within the bin 13, either greater or lesser quantities of stored grain can be held within each of the metering bins 13.

FIG. 4 of the drawings is an enlargement of the area encircled in FIG. 2 of the drawings, illustrating one means by which agricultural seed can be entrained by air and entered into the inlet opening of the first arcuate section 25 of manifold 20. In this drawing duct 17 is connected to the blower 16 (see FIG. 2) at one end and at the other end to the interior of hopper 12. The seed is held within the hopper 12 above screen 55 which separates it from the air chamber 56 so that air can blow upwardly and entrain the grain and cause it to flow out the duct 18 and on into the first manifold section 25. Seed above screen 55 enters adjustable outlet tube 60 by means of the air flowing from blower 16 and through the screen. The distance at which the lower end of tube 60 is located with respect to screen 55 can be adjusted by the collar and nut arrangement 61 and the quantity of seed being entrained in the air varied proportionally.

In operation, the inlet end of supply section 18 is connected to source 12. Source 12 may either be stationary or carried on the planting apparatus, depending upon the user's preference. During the filling operation, the seed initially exits container 12 and flows upwardly through the upper node or high point of a section 18 and then downwardly through the outlet exit end of section 18 and through the first diverter structure 26 into the first of the metering bins 13. After the first bin has become filled with grain and the grain has reached the bottom of first diverter 26, the air flow within which the seed is entrained will be carried outwardly through the other exit opening 40 of the first diverter 26 and into the inlet side of second section 25. Thereafter the filling process that occurred with respect to the first metering bin is repeated in the second metering bin until it is also filled. The identical operation will take place sequentially as each of the bins is filled until the last of the bins in the series is filled.

Once all of the bins 13 are filled and corresponding structures 26 are blocked, air entrained seed continues to flow through the diverter structures and manifold sections including return section 70 back to the hopper 12. As grain is dispensed from the metering bins and an opening in the bottom of one of the diverter structures 26 is no longer blocked by seed, air flow resumes and the bin is continuously refilled with the pre-selected quantity of seed. Importantly, because the return duct 70 enables continuous seed flow, seed is immediately available to fill an unblocked diverter structure and maintain all of the bins filled.

Figure 6:
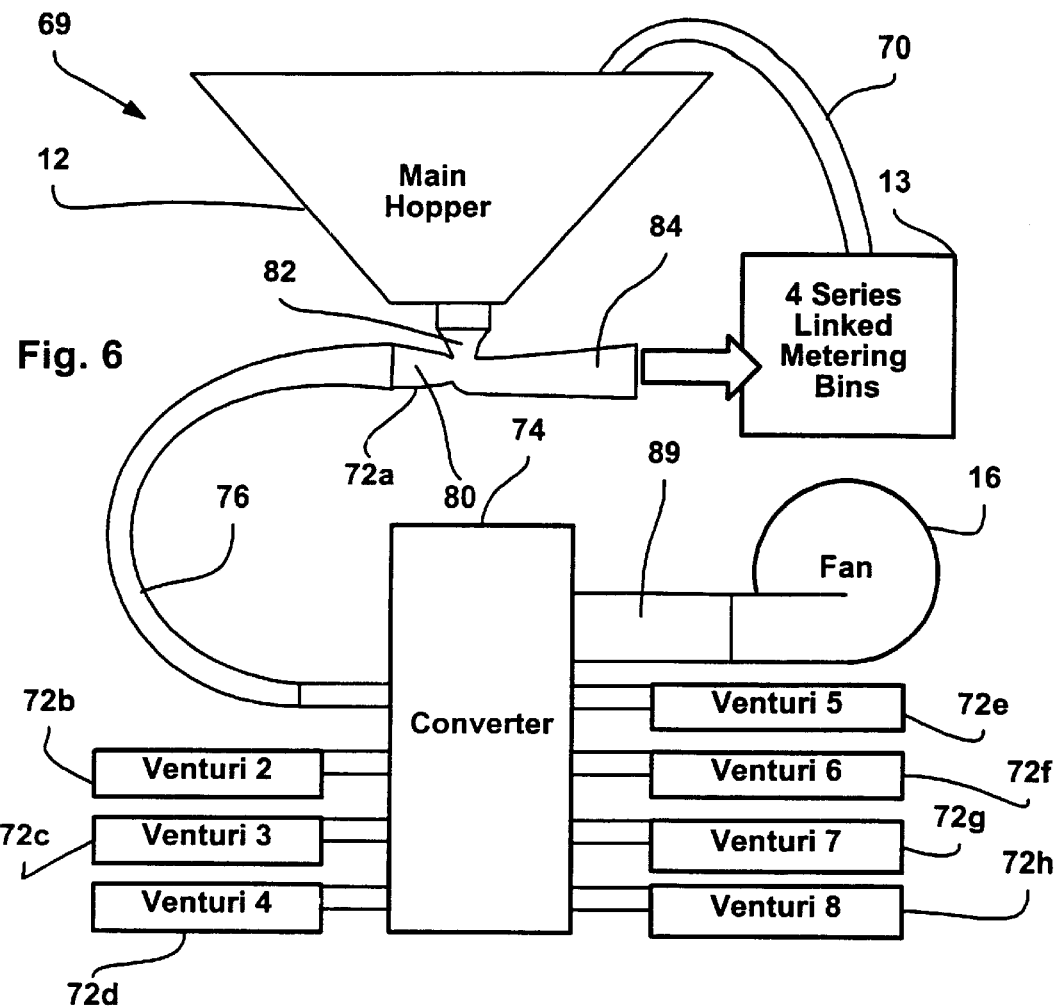
FIG. 6 is a schematic diagram illustrating an inventive configuration including venturis and a converter linked to a fan.

Referring now to FIG. 6, a schematic diagram of a seed delivery system 69 including a plurality of venturis and a converter is illustrated. To this end, like the assembly described above, system 69 includes a fan 16, a main hopper 12 and a plurality of metering bins or mini-hoppers 13 that are linked together by one or more manifold assemblies (not separately illustrated in FIG. 6) where each manifold assembly links four metering bins 13 in series. In addition, system 69 includes a converter 74 and eight separate venturis 72a through 72h.

Converter 74 is linked to fan 16 via a relatively large duct 89 (e.g., 5 inch diameter) and converts the air supplied via duct 89 into separate output air flows in eight separate output lines 76 (only one converter output line 76 numbered). Output lines 76 are relatively smaller than duct 89 (e.g., lines 76 may be between 1½ and 2 inches in diameter.

Each of venturis 72a through 72h is generally identical and therefore, in the interest of simplifying this explanation, only venturi 72a will be described here in detail. With respect to the other venturis 72b and 72h, it should suffice to say here that each of those venturis is fed by a separate and distinct line 76 from converter 74 and each in turn feeds a separate set of four series linked metering bins 13. A return duct 70 links the last of each of the four series metering bins 13 back into hopper 12. Thus, because there are eight venturis 72a through 72h and each venturi feeds four separate bins 13, system 69 is capable of delivering seed to 32 separate metering bins 13.

Figure 7:
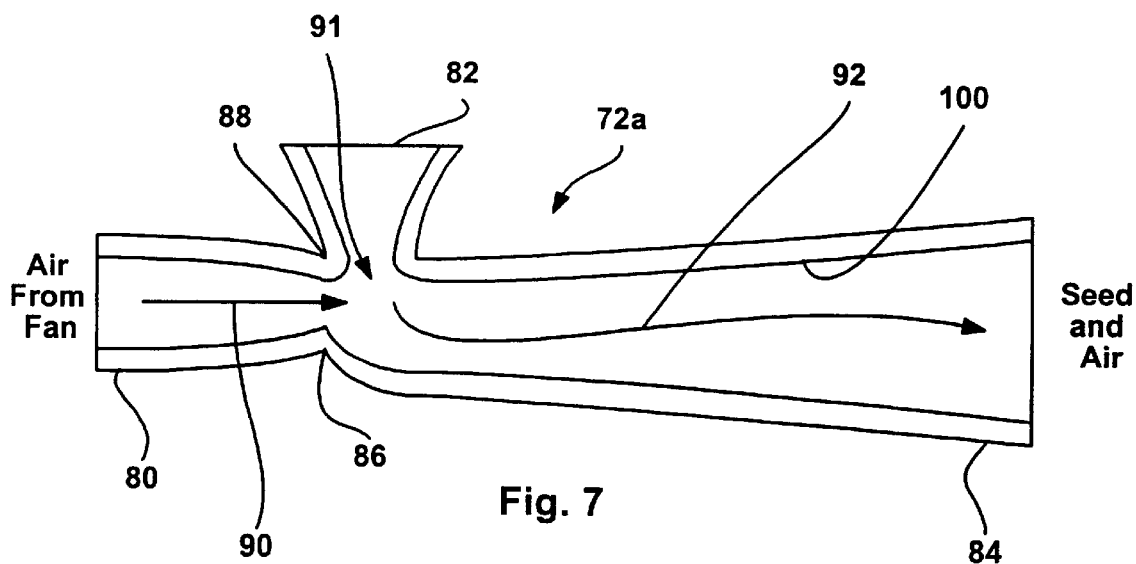
FIG. 7 is a horizontal cross-sectional view of the exemplary venturi of FIG. 6.

Referring now to FIG. 7, venturi 72a includes three ports 80, 82 and 84. Ports 80 and 82 are inlets and port 84 is an outlet. Inlet 80 is an air inlet, inlet 82 is a seed inlet and outlet 84 is a seed/air outlet. Venturi 72a is generally elongated and air inlet 80 and outlet 84 are on opposite ends thereof. Venturi 72a forms a passageway 100 between inlet 80 and outlet 84. Passageway 100 has a relatively wide diameter at inlet 80, narrows at a mid-section 86 and then expands again toward outlet 84. Thus, as with most venturis, as air is forced through restricted section 86 along the direction indicated by arrow 90, the air velocity increases and a vacuum is formed just to the right of restricted section 86 in FIG. 7.

Referring still to FIG. 7, seed inlet 82 opens downward into passageway 100 at the point where restricted area 86 causes the vacuum to be formed (i.e., just to the right of section 86 in FIG. 7). Thus, seed at the bottom 88 of inlet 82 is sucked by the vacuum along the direction indicated by arrow 91 into passageway 100 and is entrained in the air so that seed and air moves along the direction indicated by arrow 92. The seed and air is directed out outlet 84.

Referring now to FIGS. 6 and 7, converter outlet line 76 is linked to venturi air inlet 80, seed inlet 82 is linked to an outlet on the underside of hopper 12 and outlet 84 is linked to a manifold assembly like the assemblies described above and thereby to four series linked metering bins 13.

In operation, as fan 16 and converter 74 force air into venturi 72a and through restricted section 86 via air inlet 80, the forced air generates a vacuum just below seed inlet 82 within passageway 100. The vacuum draws seed into passageway 100 and the seed is entrained in the air and directed out outlet 84 to the linked metering bins. Return duct 70 provides a path from the last diverter structure in the four bin series back to hopper 12.

Thus, it should be appreciated that system 69 overcomes the delay period problem due to blocked diverter structure openings by maintaining a constant conveyance of seed entrained air to fill the bins. In addition, system 69 overcomes the fan efficiency problem by adopting a multi-venturi design that allows the fan to operate relatively efficiently to deliver seed to the large number of bins. To this end, again, where ideal manifold air volume is 140 CFM and efficient fan operation calls for between 1000 and 2000 CFM, by configuring an eight venturi system, the fan can be operated in an efficient manner to create essentially ideal seed transport air flow rate (e.g., 8×140 CFM=1120 CFM which is between 1000 and 2000 CFM).

Referring now to FIG. 8, another embodiment 72a' of a venturi is illustrated. Venturi 72a' is similar to venturi 72a except that, instead of opening upward to receive seeds from hopper 12 (see FIG. 6), seed inlet 82' opens in a lateral side wall. In this case, it is contemplated that, even in embodiments that do not include the return duct 70, the venturi may be operable. To this end, it is believed that with the side wall opening, if all diverter structures become blocked, the entire passageway 100 will likely not blocked and therefore, when a diverter structure again becomes unblocked, the venturi will again begin to operate and deliver seed to the bins.

Referring now to FIG. 9, yet one other venturi embodiment 72a" is illustrated. Venturi 72a" is similar to the venturi 72a in FIG. 7 except that seed inlet 82" opens into the bottom side of venturi 72a" and an inlet extension 102 wraps under venturi 72a" to feed seed from a hopper thereabove to inlet 82". Thus, seed accumulates just below inlet 82" and, it is believed, will not enter passageway 100 unless the vacuum is generated thereabove. Thus, as in the case of embodiment 72a', here it is believed that venturi 72a" will operate without return duct 70 to deliver seed.

It should be understood that the methods and apparatuses described above are only exemplary and do not limit the scope of the invention, and that various modifications could be made by those skilled in the art that would fall under the scope of the invention. For example, while a sinuous manifold assembly is described above that includes separate manifold sections and diverter structures, other embodiments are contemplated that may include more than one of the manifold components as a single integral part. In addition, while described in the context of a seed delivery system, it should be appreciated that the present invention is applicable to other particle type delivery systems. Moreover, all of the concepts or sub-set of the concepts described above may be combined to provide particularly useful configurations. For example, any of the venturi designs (see FIGS. 7, 8, 9) may be combined with a return duct 70. Furthermore, fewer or lesser venturis may be employed and/or fans with different operating characteristics may be employed.

To apprise the public of the scope of this invention, the following claims are made:

What is claimed is:

1. An apparatus for pneumatically transporting particulate material from a main hopper to at least a first mini-hopper sub-set, the apparatus comprising:
    a forced air source having a fan outlet;
    a venturi mounted generally below the main hopper, the venturi forming a venturi passageway between an air inlet and a venturi outlet, the passageway including a restricted section between the inlet and the venturi outlet such that, when air is forced there through, the restricted section causes a vacuum at a vacuum point downstream of the restricted section, the venturi also forming a particulate inlet proximate the vacuum point, wherein the particulate inlet opens into the passageway from below and is linked to the hopper for receiving particulate there from, and wherein the air inlet is linked to the air source; and
    at least one manifold assembly that links the venturi outlet to the first mini-hopper sub-set.

2. An apparatus for pneumatically transporting particulate material from a main hopper to at least a first mini-hopper sub-set and to N−1 additional mini-hopper sub-sets, the apparatus comprising:
    a forced air source having a fan outlet;
    a venturi mounted generally below the main hopper, the venturi forming a venturi passageway between an air inlet and a venturi outlet, the passageway including a restricted section between the inlet and the venturi outlet such that, when air is forced there through, the restricted section causes a vacuum at a vacuum point downstream of the restricted section, the venturi also forming a particulate inlet proximate the vacuum point, the particulate inlet linked to the hopper for receiving particulate there from and the air inlet linked to the air source;
    at least one manifold assembly that links the venturi outlet to the first mini-hopper sub-set; and
    at least N−1 additional venturis and N−1 additional manifold assemblies, the N−1 venturis mounted generally below the main hopper and having a design similar to that of the first venturi, the N−1 venturi air inlets linked to the air source and the N−1 venturi particulate inlets linked to the hopper for receiving particulate there from, each of the N−1 manifold assemblies linking a separate one of the N−1 venturi outlets to a separate one of the N−1 mini-hopper sub-set.

3. The apparatus of claim 2 further including a converter linked to the air source via a single air duct and including N separate converter outlet ducts, each outlet duct linked to a separate one of the N venturis, the converter dividing the air flow received form the air source approximately evenly among the N outlet ducts.

4. The apparatus of claim 3 wherein the mini-hoppers include X mini-hoppers and each sub-set includes X/N mini-hoppers.

5. The apparatus of claim 4 wherein X is 32 and N is 8.

6. The apparatus of claim 3 wherein the particulate inlets open into the passageways from above.

7. The apparatus of claim 3 wherein the particulate inlets open into the passageways from below.

8. The apparatus of claim 3 wherein the particulate inlets open into lateral sides of the passageways.

9. An apparatus for pneumatically transporting particulate material from a main hopper to at least a first mini-hopper sub-set, the apparatus comprising:
    a forced air source having a fan outlet;
    a venturi mounted generally below the main hopper, the venturi forming a venturi passageway between an air inlet and a venturi outlet, the passageway including a restricted section between the inlet and the venturi outlet such that, when air is forced there through, the restricted section causes a vacuum at a vacuum point downstream of the restricted section, the venturi also forming a particulate inlet proximate the vacuum point, the particulate inlet linked to the hopper for receiving particulate there from and the air inlet linked to the air source; and
    at least one manifold assembly that links the venturi outlet to the first mini-hopper sub-set, the manifold assembly forming a manifold passageway linked at an inlet end to the venturi outlet and having openings along its length that open into the mini-hoppers in the sub-set, wherein the sub-set includes Y series linked mini-hoppers and the manifold includes diverter structures for each of the first Y−1 mini-hoppers in the sub-set and a plurality of manifold ducts including a supply duct and intermediate ducts, each diverter structure having an inlet and first and second outlets, the supply duct linking the venturi outlet to the inlet of a first diverter structure, a separate intermediate duct linking the outlet of a preceding diverter structure to the inlet of a following diverter structure for the second through (Y−1)st diverter structures, an intermediate duct linking the outlet of the (Y−1)st diverter structure to the Yth mini-hopper and the second outlets of each of the diverter structures opening into separate ones of the mini-hoppers.

10. An apparatus for pneumatically transporting particulate material from a main hopper to at least a first mini-hopper sub-set, the apparatus comprising:
    a forced air source having a fan outlet;
    a venturi mounted generally below the main hopper, the venturi forming a venturi passageway between an air inlet and a venturi outlet, the passageway including a restricted section between the inlet and the venturi outlet such that, when air is forced there through, the restricted section causes a vacuum at a vacuum point downstream of the restricted section, the venturi also forming a particulate inlet proximate the vacuum point, the particulate inlet linked to the hopper for receiving particulate there from and the air inlet linked to the air source; and
    at least one manifold assembly that links the venturi outlet to the first mini-hopper sub-set, the manifold assembly forming a manifold passageway linked at an inlet end to the venturi outlet and having openings along its length that open into the mini-hoppers in the sub-set, wherein the end of the manifold passageway opens into the main hopper.

11. An apparatus for pneumatically transporting particulate material from a main hopper to at least N mini-hopper sub-sets, the apparatus comprising:
    a forced air source having a fan outlet;
    a converter operably linked to the air source to receive forced air there from and to split the received air flow into N separate air flows through N separate converter outlet lines;

N venturis mounted generally below the main hopper, each venturi forming a venturi passageway between an air inlet and a venturi outlet, each passageway including a restricted section between the inlet and the venturi outlet such that, when air is forced there through, the restricted section causes a vacuum at a vacuum point downstream of the restricted section, each venturi also forming a particulate inlet proximate the vacuum point, the particulate inlets linked to the hopper for receiving particulate there from and each air inlet linked to a separate one of the converter outlets; and N manifold assemblies, each manifold assembly linking a separate one of the venturi outlets to a separate one of the N mini-hopper sub-sets.

12. The apparatus of claim 11 wherein the particulate inlets open into the passageways from above.

13. The apparatus of claim 11 wherein the particulate inlets open into the passageways from below.

14. The apparatus of claim 11 wherein the particulate inlets open into lateral sides of the passageways.

15. The apparatus of claim 11 wherein the mini-hoppers include X mini-hoppers and each sub-set includes X/N mini-hoppers.

16. The apparatus of claim 11 wherein each manifold assembly forms a manifold passageway linked at an inlet end to a corresponding venturi outlet and having openings along its length that open into the mini-hoppers in a corresponding sub-set and, wherein, the ends of the manifold passageways open into the main hopper.

* * * * *